Patented June 28, 1927.

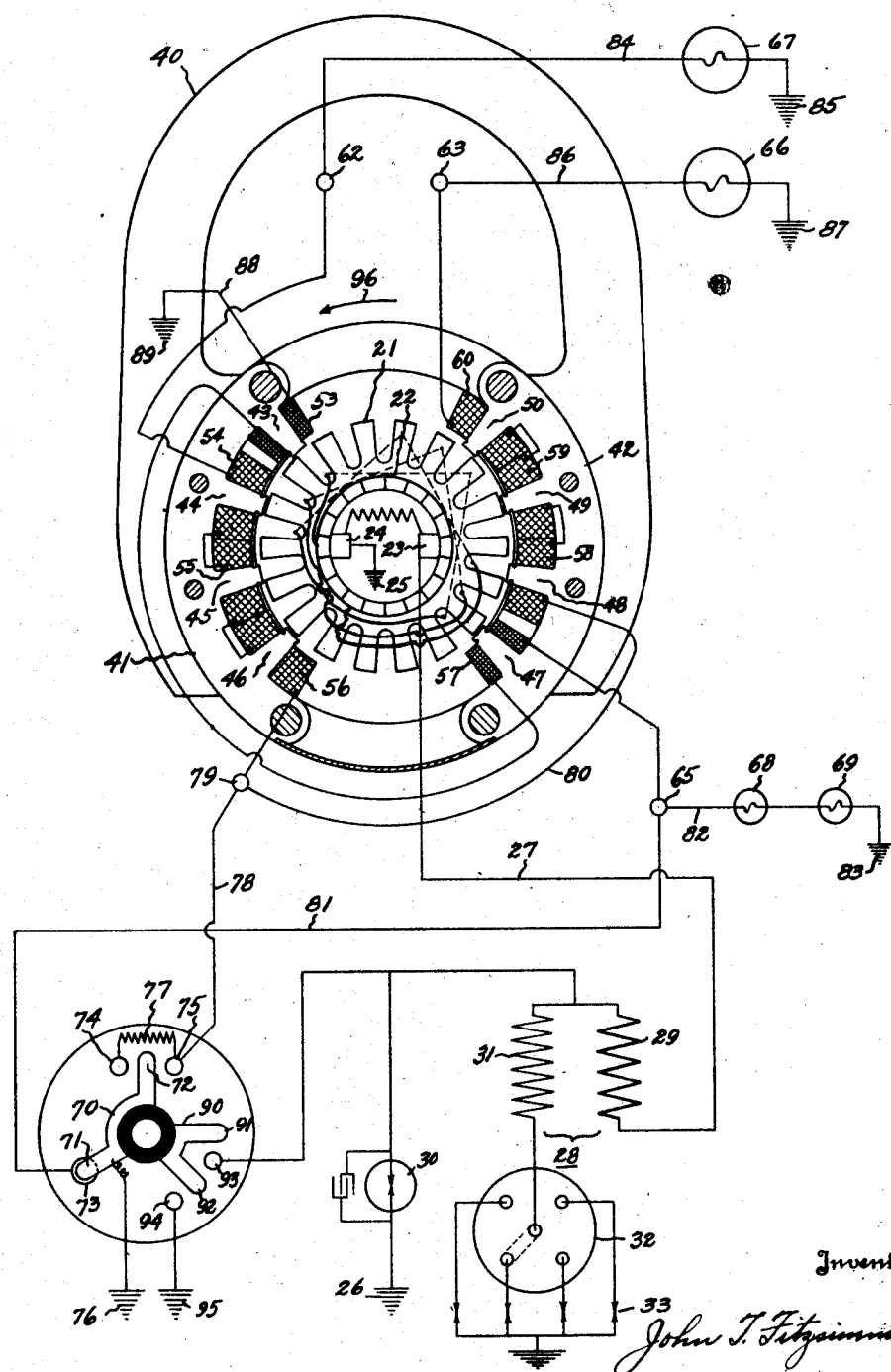

1,633,780

UNITED STATES PATENT OFFICE.

JOHN T. FITZSIMMONS, OF DAYTON, OHIO, ASSIGNOR TO GENERAL MOTORS RESEARCH CORPORATION, OF DAYTON, OHIO, A CORPORATION OF DELAWARE.

ELECTRICAL GENERATING SYSTEM.

Application filed March 14, 1925. Serial No. 15,639.

This invention relates to electrical generators, the poles of which are provided with spaced teeth carrying windings in which alternating currents are generated by rotating a toothed rotor past the pole teeth. The toothed rotor may carry armature windings in which other currents are generated by reason of the cooperation of the rotor with the generator field.

This invention relates more particularly to the lighting and ignition generator described and claimed in the copending application of John H. Hunt and John T. Fitzsimmons, Serial #3732, filed January 21, 1925. This application discloses a generator having a bi-polar field excited by a permanent magnet, the poles of which are provided with pole teeth projecting toward the armature and each surrounded by a generating coil or a pole winding. The pole windings, on the two pole tips which are adjacent the leading portion of the poles are connected cumulatively in series so as to furnish current for the cowl lamp and tail lamp of an automobile. The other windings on each of the poles are connected cumulatively in series with one of the head lamps of the automobile. The armature core is provided with equally spaced teeth and the angle between any two adjacent teeth is two-thirds of the angle between adjacent pole face teeth. The armature windings are "wave" or "lap" wound upon the core and are connected with a suitable commutator so that direct current may be obtained for ignition purposes.

One of the objects of the present invention is to reduce a humming noise known as magnetic hum in the generator of the type referred to. It has been observed that there is considerably less magnetic hum in the operation of a generator of the type described in the copending application referred to when the pole windings are supplying current to electrical translation devices than when the pole windings are disconnected from the translation devices. It has been found that hum can be substantially reduced by maintaining the flow of current in certain pole windings although no current may be flowing in other pole windings. In order to accomplish the object of the present invention I take advantage of this phenomenon by providing a controller which is operable into one position to cause the pole windings to supply current to certain electrical translation devices and operable to another position to disconnect said translation devices and for causing certain of the pole windings to be short-circuited. In applying the present invention to the generator described in the copending application referred to, I preferably provide means for short-circuiting the pole windings adjacent the leading tips of the field magnet poles in order that there will be the least interference with the generation of current in the armature windings carried by the toothed rotor.

Further objects and advantages of the present invention will be apparent from the following description, reference being had to the accompanying drawings, wherein a preferred form of the embodiment of the present invention is clearly shown.

In the drawings:

The drawing is a wiring diagram illustrating one form of the present invention.

In the drawing, 20 designates a generator having an armature 21 connected with a commutator 22 which cooperates with brushes 23 and 24 to supply, through ground connections 25 and 26 and wire 27, current for internal combustion engine ignition apparatus which includes an ignition coil 28 having its primary winding 29 connected with an ignition timer 30. The secondary winding 31 of coil 28 is grounded through the primary circuit and is connected with a distributor 32 for distributing sparking impulses to the various spark plugs 33 of the engine.

The generator 20 includes a permanent magnet field 40 having poles 41 and 42 provided, respectively, with pole teeth 43, 44, 45, 46 and 47, 48, 49, 50. These pole teeth carry, respectively, windings 53, 54, 55, 56, 57, 58, 59 and 60. Windings 54, 55 and 56 are connected cumulatively in series with terminals 79 and 62. Windings 58, 59 and 60 are connected cumulatively in series with terminals 79 and 63. Windings 53 and 57 are connected cumulatively in series with terminal 65, wire 88 and ground connection 89. These windings may be used, for example, to supply current for the headlights 66 and 67 of an automobile, and the dash and tail lamps 68 and 69 which are lower in candle power and wattage than the lamps 66 and 67.

The armature 21 is preferably of the type described in the copending application of John H. Hunt and John T. Fitzsimmons, Serial No. 3732, filed January 21, 1925 and comprises a rotor having eighteen equally spaced teeth, the spacing being 20 degrees or two-thirds the spacing of the pole teeth which are spaced 30 degrees. The rotor may be "lap" or "wave" wound. Rotation of the rotor will produce variations in flux in the pole teeth so that alternating currents will be generated in the pole windings in order to supply the currents needed for the different lighting circuits mentioned in the preceding paragraph. While the angular spacing of adjacent pole teeth is 30 degrees, the angular distance between pole teeth 43 and 50 is 80 degrees and the angular distance between pole teeth 46 and 47 is 100 degrees in order to minimize the fluctuation in armature voltage as explained in the copending application referred to.

The circuits and controller therefor for rendering the lights operative when desired includes a movable switch element 70 carrying contacts 71 and 72. Contact 72 is adapted to engage either contact 74 or 75 while contact 71 makes no circuit connection; and contact 71 is adapted to engage contact 73, while contact 72 makes no connection with either contact 74 or contact 75. Switch member 70 is grounded at 76. A headlight dimmer resistance 77 is connected between contacts 74 and 75. Contact 75 is connected by wire 78 with terminal 79. Contact 73 is connected by wire 81 with terminal 65 which is connected by wire 82 with lamps 68 and 69 grounded at 83. Terminal 62 is connected by wire 84 with lamp 67 grounded at 85. Terminal 63 is connected by wire 86 with lamp 66 grounded at 87.

An ignition switch contact member 90 is provided with contacts 91 and 92 adapted to engage stationary contacts 93 and 94 respectively. Contact 93 is connected in the ignition primary circuit between the primary 29 and the timer 30. Contact 94 is grounded at 95.

The operation of the invention is as follows:

When the contact 90 engages contacts 93 and 94 it is evident that the ignition timer will be short circuited, and that no ignition for the engine will be provided. To render the ignition circuit operative, the ignition switch contact 90 is moved to the position shown in the drawing. It is to be understood that the present invention is not limited to the use of the ignition apparatus in circuit with the generator armature although the present invention is particularly adapted for a lighting and ignition system for automotive vehicles.

If it is desired to operate all of the lamps and to operate the head lamp brightly, the switch contact 70 is moved clockwise so as to bring contacts 72 and 75 into engagement. The following lighting circuits will then be established: Head lamp circuit including ground 76, contacts 72, 75, wire 78, terminal 79, wire 80, pole windings 58, 59 and 60, terminal 63, wire 86, lamp 66, ground 87; head lamp circuit including the circuit previously described from ground 76 to terminal 69, then pole windings 56, 55, 54, terminal 62, wire 84, head lamp 67, ground 85; and a dash and tail lamp circuit including ground 89, wire 88, pole windings 53 and 57, terminal 65, wire 82, lamps 68 and 69 and ground 83. When it is desired to burn the head lamps dim the switch member 70 is rotated counterclockwise to bring the contacts 72 and 74 into engagement.

When it is desired to operate the generator without burning the lamps, the switch 70 is moved to the position shown in the drawing so that contacts 71 and 73 are engaged while the contact 72 makes no electrical connection. This position of the switch causes the pole windings 53 and 57 to be short circuited by grounding the terminal 65 through wire 81, contacts 71 and 73 and ground connection 76. This ground connection causes a current flow to be maintained through the pole windings 53 and 57 while the lamps are not being burned. Maintaining current flow in certain pole windings has been found to reduce the magnetic hum to a degree not objectionable without substantially interfering with the operation of the work circuit such as the ignition circuit connected with the armature 21. Short circuiting all of the pole windings when not burning lamps would seriously interfere with the operation of the ignition apparatus connected with the armature. It has been found that magnetic hum can be reduced by short circuiting only a part of the pole face windings, preferably the windings located adjacent the leading tips of the field poles, for example, windings 53 and 57, direction of armature rotation being indicated by arrow 96.

Why the flow of current through some or all of the pole windings reduces magnetic hum in the generator of the type referred to is not definitely known. The best explanation which can be given at the present time is that the flow of current in a pole face winding hinders or retards the shifting of flux from a pair of alternately-spaced pole teeth to the other pair of alternately-spaced pole teeth. As the rotor of the armature 21 revolves flux will be shifted from the pair of poles 43, 45 to the pair of poles 46, 44; and likewise from the pair of poles 47, 49 to the pair of poles 48, 50. It is believed that the shifting of flux between these pairs of poles produces magnetic hum in this type of generator and that if the rate of shift is retarded magnetic hum will be reduced. It is believed that this shifting of magnetic flux is reduced when current flows in some or all of the pole windings. When all of the pole windings are supplying current it has been found that magnetic hum is eliminated in the greatest extent. When not burning the lamps all of the windings could be short-circuited in order to reduce magnetic hum to the same extent as occurs when burning the lamps. Short-circuiting of all of the pole face windings has been found to interfere materially with generation of current in the armature 21 for ignition purposes. In order that there will be sufficient current for ignition purposes at low engine speed, and hence at low generator speed, it is preferable to short-circuit only part of the pole windings. Very satisfactory results have been obtained by short-circuiting the windings 43 and 47 adjacent the leading tips of the magnetic poles when not burning the lamps. Sufficient current can be provided for ignition purposes when cranking the engine and magnetic hum will be substantially reduced at higher engine speeds.

The pole windings 53 and 57 for supplying lamps of a lower wattage comprise a relatively large number of turns of fine wire, while the other pole windings comprise a smaller number of turns of relatively coarse wire. Separate generating circuits are therefore arranged to provide current at different wattages for the work circuits.

While the form of embodiment of the present invention as herein disclosed, constitutes a preferred form, it is to be understood that other forms might be adopted, all coming within the scope of the claims which follow.

What is claimed is as follows:

1. An electrical system comprising, in combination, a generator having a rotor and a field magnet provided with pole teeth carrying windings; electrical translation devices; and circuits and a controller therefor operable to one position to cause the devices to be operated by current from said pole windings, and operable to another position to discontinue operation of said devices and for causing certain of the pole windings to be short circuited.

2. An electrical system comprising, in combination, a generator having a rotor and a field magnet provided with pole teeth carrying windings; electrical translation devices; and circuits and a controller therefor operable to one position to cause the devices to be operated by current from said pole windings, and operable to another position to short circuit certain pole windings and the devices supplied with current therefrom.

3. An electrical system comprising, in combination, a generator having a rotor and a field magnet provided with pole teeth carrying windings; electrical translation devices; and circuits and a controller therefor operable to one position to cause the devices to be connected with said pole windings, and operable to another position to disconnect certain devices from the pole windings supplying them with current, and for short circuiting other pole windings.

4. An electrical system comprising, in combination, a generator having a rotor and a field magnet provided with pole teeth carrying windings; electrical translation devices; and circuits and a controller therefor operable to one position to connect certain devices with only the pole windings adjacent the leading tips of the poles, and to connect other devices with other pole windings, and operable to another position for discontinuing operation of the devices and for short circuiting only the pole windings adjacent the leading pole tips.

5. An electrical system comprising, in combination, a generator having a rotor and a field magnet provided at the leading tips of the poles thereof with pole teeth carrying windings; electrical translation devices; a circuit for connecting the devices and windings; and means for short circuiting the windings.

6. An electrical lighting and ignition system comprising, in combination, a generator having an armature and a field magnet provided with pole teeth carrying windings; electric lamps; ignition apparatus connected with the armature; and circuits and a controller therefor operable to one position to connect the lamps with the pole windings, and operable to another position to disconnect certain windings and to short circuit certain other windings in order to reduce magnetic hum without hindering the operation of the ignition apparatus.

7. An electrical lighting and ignition system comprising, in combination, electric lamps; ignition apparatus; a generator having an armature and a field magnet provided with pole teeth, the pole windings at the leading tips of the poles being connected in series with certain lamps and the other pole windings being cumulatively connected for operating the other lamps; a circuit for connecting the ignition apparatus with the armature; and circuits and operating means therefor for causing the lamps to be operated by current generated in the pole windings, or for discontinuing the operation of the lamps while short circuiting only the pole windings at the leading tips whereby magnetic hum will be reduced without substantially interfering with the operation of the ignition apparatus.

In testimony whereof I hereto affix my signature.

JOHN T. FITZSIMMONS.